(No Model.)

T. A. JACKSON.
DIAMOND SAW TOOTH.

No. 341,011. Patented May 4, 1886.

Witnesses

Inventor
Thaddeus A. Jackson,
By his Attorney Chas. H. Fowler

UNITED STATES PATENT OFFICE.

THADDEUS A. JACKSON, OF NEW YORK, N. Y.

DIAMOND SAW-TOOTH.

SPECIFICATION forming part of Letters Patent No. 341,011, dated May 4, 1886.

Application filed July 16, 1885. Serial No. 171,767. (No model.)

*To all whom it may concern:*

Be it known that I, THADDEUS A. JACKSON, a citizen of the United States, residing at New York, in the county of New York and State of New York, have invented certain new and useful Improvements in Diamond Saw-Teeth; and I do hereby declare that the following is a full, clear, and exact description of the same, reference being had to the annexed drawings, making a part of this specification, and to the letters and figures of reference marked thereon.

Figure 1:
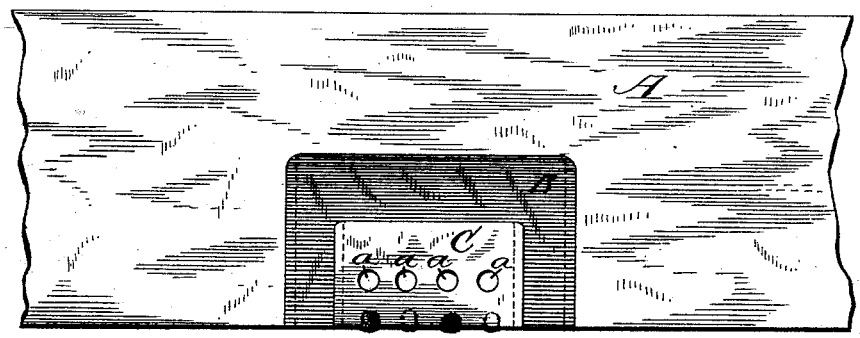
Figure 2:
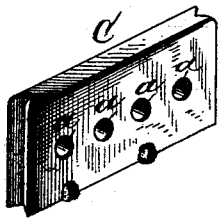

Figure 1 of the drawings is a side elevation of a saw-blade and insertible diamond tooth constructed in accordance with my invention, and Fig. 2 a detail view of the auxiliary tooth or holder.

The present invention has relation to the construction of diamond saw-teeth, and the object thereof is to facilitate the lubrication of the saw by providing means whereby the water can freely pass from one side of the saw to the other. This I attain by forming a hole or perforation through the diamond saw-tooth or diamond-holder over or substantially on a line with each diamond, thereby allowing the water to pass and repass from one perforation or hole to the other, to keep up a constant lubrication of the saw while in use, as will be hereinafter more fully described and claimed.

In my device the diamond teeth are secured in the holder upon the working-edge and upon alternately opposite sides. The heating caused by friction is liable to heat the metal opposite each diamond. I provide that each passage or aperture shall be above the tooth upon one side and midway between two teeth upon the other side; hence the motion of the saw will distribute the lubricant from the hot diamond upon either side over the space opposite the diamond upon either side, while the passages supply freely both over the diamond and space.

I am aware that diamonds have been embedded in heated metal by placing the diamonds in vertical slits formed in the saw. These slits have had circular enlargements at the upper ends to facilitate the opening of the slit and to prevent cracking of the saw by extending the slit.

Holes with cutting edges have been arranged at suitable distances apart in circular saws for other purposes. In either of the cases mentioned the purposes have been different.

In the accompanying drawings, A represents a portion of a saw plate or blade provided with an insertible saw tooth or plate, B, to which is suitably connected the auxiliary tooth or holder C.

The parts above described are all of the usual construction, and therefore may be modified or changed as found desirable.

The auxiliary tooth or holder C, to which the diamonds are secured, or, if preferred, the insertible tooth or plate B, I provide with holes or perforations $a$, which allow the water to pass from one side of the saw to the other, thus effectually lubricating it and rendering the saw more effective.

Having now fully described my invention, what I claim as new, and desire to secure by Letters Patent, is—

The saw-tooth holder described, having its lower edge provided with diamonds arranged alternately upon opposite sides and having lubricating-passages that extend through the holder above the diamond upon one side and above the space between two adjacent diamonds upon the opposite side, as and for the purposes set forth.

In testimony that I claim the above I have hereunto subscribed my name in the presence of two witnesses.

THADDEUS A. JACKSON.

Witnesses:
JAMES F. C. BLACKHURST,
JOS. D. CATHCART.